Feb. 11, 1958 A. WARTO 2,822,994
AIRCRAFT WITH PIVOTALLY MOUNTED FUSELAGE
Filed Aug. 27, 1953 3 Sheets-Sheet 1
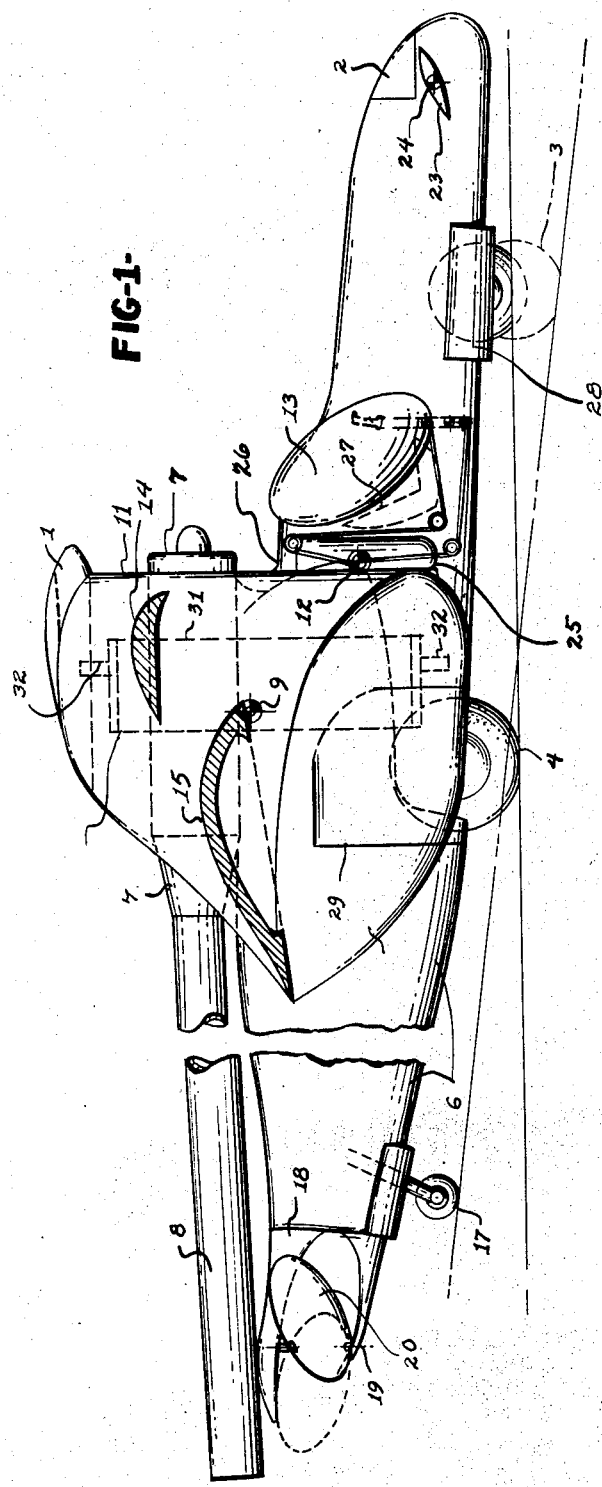
INVENTOR.
ARISTIDES WARTO
BY Feb. 11, 1958     A. WARTO     2,822,994
AIRCRAFT WITH PIVOTALLY MOUNTED FUSELAGE
Filed Aug. 27, 1953     3 Sheets-Sheet 2
FIG-2-
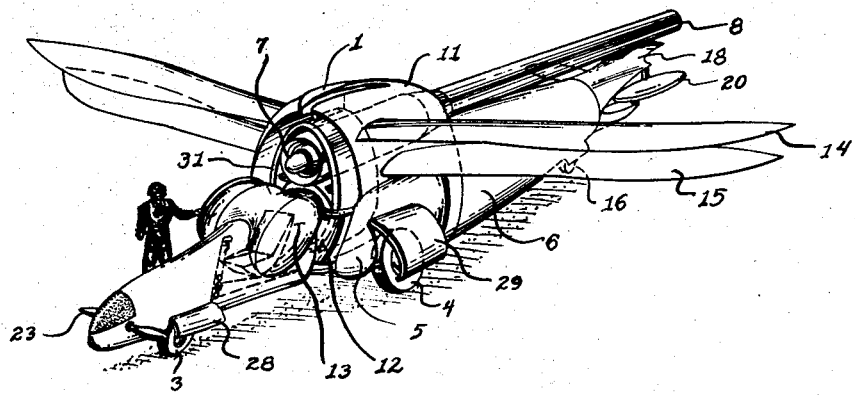
FIG-3-
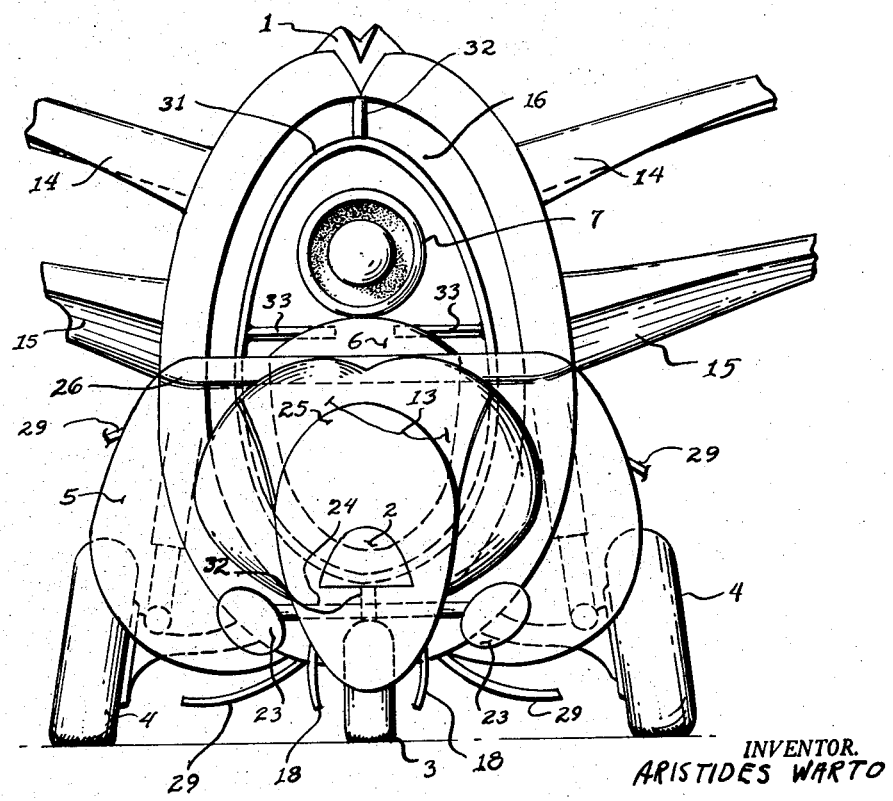
INVENTOR.
ARISTIDES WARTO
BY

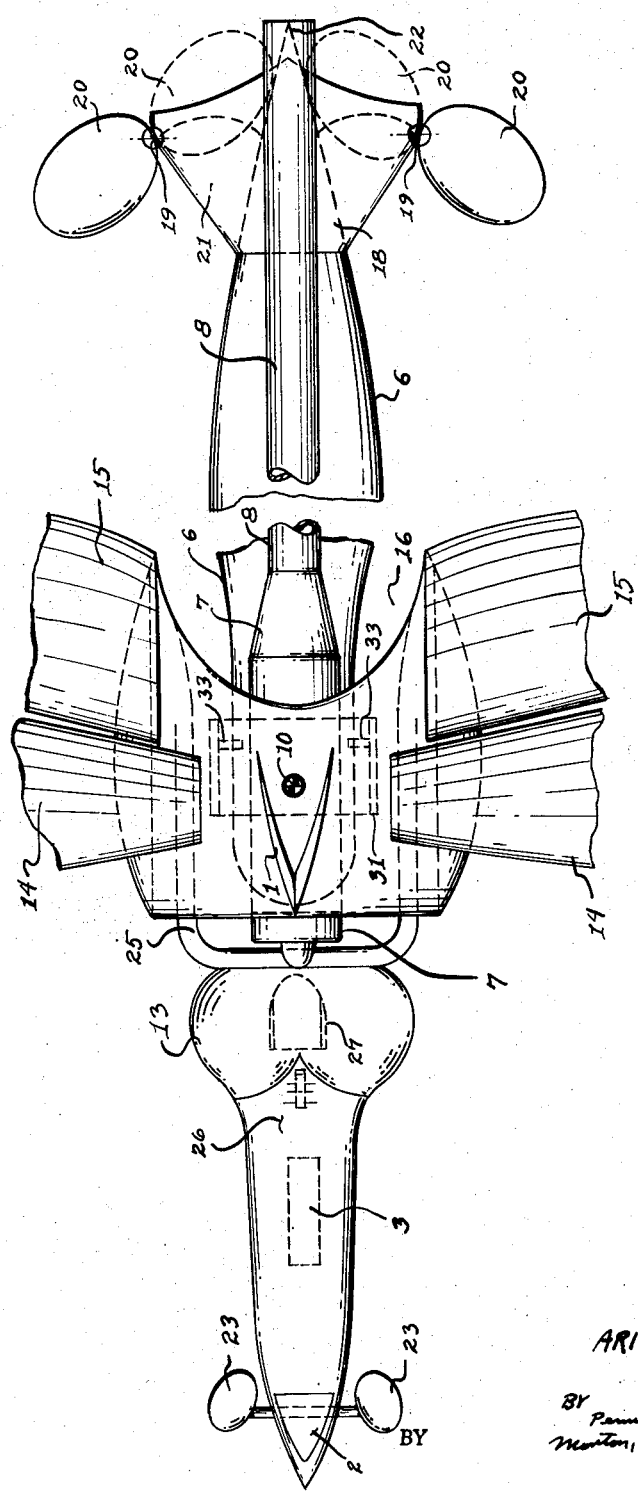

United States Patent Office 2,822,994
Patented Feb. 11, 1958

2,822,994

AIRCRAFT WITH PIVOTALLY MOUNTED FUSELAGE

Aristides Warto, Cruzeiro, Brazil

Application August 27, 1953, Serial No. 376,850

8 Claims. (Cl. 244—13)

My invention relates to improvements in airplanes, and more particularly to an airplane provided with a leading part connected to the leading end portion of the fuselage by a universal joint.

It is a well known fact that all present day airplanes are structured along the lines of a simple lever having three basic points for the application of power, support and resistance. In the new type of airplane provided by the present invention the structure of same is entirely novel and absolutely unconventional, since said structure rests on the principle of composite levers or, in other words, two levers interconnected by means of a universal joint arranged in an annular supporting cover, circular in form and of a diameter greater than the diameter of the fuselage, said cover enclosing the whole circumference of the forward end portion of the fuselage and permitting free movement of the front part of the plane, constituting the second lever, separately from the trailing part or fuselage of same which constitutes the first lever, thus providing, due to mutual reaction, a highly scientific assembly of great maneuverability and completely exempt from shock stall. To this end, said annular supporting cover, circular in form and of a diameter greater than the fuselage, includes an integral universal joint which supports the forward end part of said fuselage, said joint providing for free movement of the fuselage relative to the leading part of the airplane and thus giving it floating characteristics. The improved airplane also includes retractible tail parts, in that elevating members capable of retraction so as to be withdrawn in case of need into the interior of the tail part.

This new system for the construction of airplane structures—the composite lever system—provides for freedom of movement of the fuselage which can thus move independently of the leading part of the airplane carrying the wings and pilot cabin, thus giving the pilot absolute control of the aircraft at all speeds, altitudes or flight phases, without resource to any other known control organ.

Said results are made possible by the structure herein claimed and illustrated in the attached drawings, wherein, Fig. 1 is a broken side view partly in section of an airplane, embodying this invention, Fig. 2 is a perspective of the airplane, Fig. 3 is a front view of the airplane with parts broken away at each side thereof, and, Fig. 4 is a broken plan view of the airplane.

Similar numbers indicate the same or corresponding parts in all the different figures of the drawing, thus, 1 is the aerodynamical shear or knife projecting from the top of an annular cover 11, 2 the airplane nose, 3 the retractible nose wheel, 4 the retractible side wheels carried by the annular cover, 5 the bulges for accommodating said side wheels, 6 the floating fuselage, 7 the jet motor mounted on the fuselage, 8 the motor exhaust pipe, 9, the horizontal pivot axis for the floating fuselage in the universal joint mounted in the annular cover 11, 10 the vertical suspension point or pivot axis of said universal joint providing for free movement of said fuselage relative to the leading section of the plane and giving it truly floating characteristics, 11 is the annular supporting cover, circular in form, which envelops all of the forward end of the fuselage, 12 is the resistance point of the first lever, represented by the fuselage, 13 is the pilot cabin arranged in the nose section 2, 14 are the leading wings and 15 the trailing wings mounted respectively on the sides of the annular cover, 16 is the fuselage orbit which is the gap formed by the difference in diameter between the annular supporting cover and the forward portion of the fuselage, 17 is the tail or tricycle retractible wheel, 18 is the tail base support, 19 are the turning shafts for the elevators mounted in the support 18, 20 are the elevators carried respectively by the shafts 19, 21 are the channels wherein the elevators may be retracted as indicated in dotted lines in Fig. 4, 22 is the aerodynamical guide at the tail of the plane, 23 are the nose elevators and 24 is the turning shaft for the nose elevators. The nose section of the plane, including the pilot's cabin, is rigidly connected to tthe annular cover 11 by upper and lower frame members 25 and 26, as shown in Figs. 3 and 4. A pilot's chair 27 is indicated in dotted lines.

The drawings show the doors for the landing wheels. For example, the doors for the nose section wheel 3, are shown at 28 in Figs. 1 and 2, the doors for the wheels 4 are shown at 29 in Figs. 2 and 3, and one of the doors for the wheel 17 is shown in Figure 1.

The universal joint mounted in the space 16 between the annular cover 11 and the forward end of the fuselage 6 may be of conventional construction, as indicated more or less diagrammatically in Figs. 1, 2 and 4. As illustrated, this universal joint structure, which supports the forward end of the fuselage in spaced relation to the inner surface of the annular cover 11 comprises an annular band 31 surrounding the fuselage 6 and jet motor 7 carrying upper and lower shafts 32 arranged vertically and pivoted respectively in the upper and lower portions of the annular cover 11. The fuselage 6 is pivoted to the band 31 by horizontally-arranged pivot shafts 33 fixed to the band 31 and pivotally mounted respectively to opposite upper side portions of the fuselage. When the fuselage 6 and the leading end section of the plane are in their normal straight relationship, the pivot shafts 33 are in line at the indicated horizontal axis 9, while the vertically arranged shafts 32 are located in line with the vertical axis 10. This new type of plane provided with floating fuselage and retractible tail elevators, presents great advantages as is easily understood. Thus, 6 indicates the fuselage which, and because of being supported by the universal joint situated in the interior of the annular supporting cover provides free movement for said fuselage, rendering same truly floating in nature. Said movement is transmitted by the pilot, by means of cables and pulleys and through the medium of hydraulic or electric means, to resistance point 12 of the first lever, constituted by said fuselage, separate from the leading part which forms the second lever, the movements of which are reciprocal and co-ordinated with those of said first lever, since the two levers are connected by the universal joint structure located in the annular supporting cover 11. Thus, the pilot at the controls in the cabin 13, by actuating his stick, can transmit said movement, through the means already mentioned, to said point 12, thus steering the nose of the plane in any direction and therefore moving the wings to any desired position, independently of the fuselage. With this new system the pilot obtains absolute control of his plane. The airplane is thus steered in the direction to which the tail part is forced. Should the tail part be elevated, the nose will be automatically lifted, when the tail part is lowered the nose is lowered, if said tail part be turned to the left the plane will turn left and if the tail part is turned to the right the plane will veer to the right. This action is similar to the usual function of a rudder normally used in airplanes. Thus, the maneuvering of the novel plane herein provided is the complete opposite of present conventional airplanes and provides perfect and absolute control of said plane in all its flight phases and at all speeds and altitudes.

It is a known fact that for a plane to be subject to shock stalling the tail of same will have to be elevated; however, in the present case, the elevation of the tail gives rise, automatically to an elevation of the nose, thereby automatically neutralizing shock stall.

Reference numbers 14 and 15 designate the leading and trailing wings, the details of which—applicable to propellers as well as wings—have already been filed with the Patent Office and described in application Ser. No. 171,265, filed June 30, 1950, now issued as Patent No. 2,720,928 on October 18, 1955. Said wings, due to their characteristics and highly scientific construction, draw in the mass of air in front of the plane, thereby creating a sort of vacuum and permitting easier progress of the plane. Said wings, besides, due to the spectre of the surrounding air and in cooperation with the effects of the floating fuselage, as explained above provide a double anti-shock stall action, thereby considerably increasing safety in flight and making possible the obtaining of supersonic velocities. The same circumstances ensure correct performance of the plane at low speeds, as during take-off and landing.

Reference number 11 indicates the annular supporting cover, in the form of a ring surrounding the fuselage.

Said annular supporting cover bears, on its outer surface, the aerodynamical knife 1, designed to sort of making a furrow in the air, to be filled in by another air current which, due to physical effects, wipes away the laminar coating of air lying on the outer surface of the plane, thus favoring a better sliding and penetration of the aircraft in the air currents, at the highhest speeds. Besides, the annular supporting cover, greater in diameter than the fuselage and surrounding the forward portion of the fuselage as if it were a band, leaves in between a gap 16 constituting the fuselage orbit wherein prevails a suction-like action which draws in air from the front and sides of the ship, said air being then thrown away from the course of the plane, thus neutralizing the harmful effects of the laminar coating or bed of air. This happens as a result of the aerodynamical effects of said wings which dispense a special treatment to the air, preventing it from accumulating in front of the wings in successive rebounding or compressive waves which might give rise to the undesirable sonic wall and, on the contrary, neutralizing the harmful action of air accumulations and converting same into an action favorable to the flying properties and the speed of the ship which may thus attain speeds greater than that of sound. Reference numbers 18 and 22 indicate the retractible tail part wherein lie the rotating shafts 19 which promote free movement of the elevating means 20, displacing same and thereby providing greater tail surface and greater or lesser lead angles as regards the air currents and thus regulating the ascension of the plane according to flight requirements, said elevating means being entirely retractible within the tail part and into said channels 21, as shown in Fig. 4. Thus, when the elevators are completely retracted, at high speeds, for which they are not suitable, they offer no resistance to progress of the ship. Said channels 21, by compressing the air within their walls, accelerate the air accumulations, thus forming an air current which removes—by suction—the laminar and turbulent coating of air lying over the outer surface of the elevators when same are open, and removes same by pressure and expansion, when they are closed or retracted, the whole assembly thus cooperating on behalf of the perfect sliding of the aircraft through the surrounding air currents, especially at the higher speeds.

Reference number 22 indicates the aerodynamical guide, having the same properties as the aerodynamical knife 1, as regards cause and effect on air action and reaction, as already explained, thus opening a sort of furrow in the tail end air which is thereby divided into two separate parts, the upper air currents being truly led downward and then drawn backwards, so that said currents, after having left the tail part may not be drawn unto or whip against said member or any of its parts, as this might cause damage at very high speeds. Present day conventional planes have a fixed fuselage, immovable as a whole, and, thus, they progress exclusively by means of well known control members, such a ailerons, direction rudder, drift rudder, slots, flaps and such, which are the cause of frequent deficiencies in the management of aircraft, since all aeronautical technicians know very well that both at the very high and at the very low speeds the ailerons, placed at the wing ends, do not provide the expected results and in some cases prove entirely useless. Said drawbacks are completely eliminated by the scientifically built structure and the truly original and unconventional characteristics of the structure herein claimed which are bound to exert a decisive influence on the evolution and progress of aviation throught the world, even on flights within the stratosphere and the ionosphere.

I claim:

1. An airplane comprising a leading section including an annular supporting cover in the form of a ring, retractable landing wheels carried by the supporting cover, wings carried by and projecting from the periphery of said supporting cover, a nose section provided with a pilot's cabin attached to the forward end of said annular cover, a trailing section comprising a floating fuselage carried by the supporting cover and extending to the rear thereof generally in line with the nose section, the forward portion of the floating fuselage extending into said supporting cover from the rear and positioned in spaced relation to the interior of the supporting cover, a universal joint structure pivotally supporting the floating fuselage in the annular supporting cover, said universal joint structure being located rearwardly of the forward end of the floating fuselage and said forward end of the floating fuselage being movable relative to the interior of the annular supporting cover with the universal joint structure as a fulcrum, whereby the relative angular relationships between the floating fuselage and the leading section of the airplane including the annular supporting cover and nose section may be adjusted, and means carried by the airplane for propelling the same.

2. An airplane as claimed in claim 1, in which the floating fuselage includes a tail portion provided with an elevator support, and an elevator pivoted to said support on a vertical pivot axis on each of the opposite sides of the tail portion.

3. An airplane as claimed in claim 2, in which each elevator comprises a flat oval-shaped member pivoted from a point adjacent its periphery and swingable toward and away from the longitudinal axis of the tail portion of the floating fuselage to respectively decrease and increase the effective elevator surface with respect to air currents.

4. An airplane as claimed in claim 3, in which the rear portion of the elevator support is provided with recesses for respectively receiving the elevators when they are swung to their retracted positions toward the longitudinal axis of the tail portion of the floating fuselage.

5. An airplane as claimed in claim 1 in which the universal joint structure is located within the annular suporting cover.

6. An airplane as claimed in claim 1, in which the annular supporting cover extends around the forward end portion of the floating fuselage and said wings are fixed to the supporting cover and are movable integrally therewith relative to the floating fuselage.

7. An airplane as claimed in claim 1, including an elevator pivoted to the forward portion of the nose section on each of its opposite lateral sides.

8. An airplane as claimed in claim 1, in which the nose section of the airplane includes a retractable landing wheel.

References Cited in the file of this patent

UNITED STATES PATENTS

| | | |
|---|---|---|
| 1,109,891 | Young | Sept. 8, 1914 |
| 1,622,191 | Filippi | Mar. 22, 1927 |
| 2,453,514 | Jerome | Nov. 9, 1948 |

FOREIGN PATENTS

| | | |
|---|---|---|
| 7,003 | Great Britain | of 1913 |

OTHER REFERENCES

"Flight," issue of June 11, 1942; page 19, Advertisements, 244–75.5.